Patented Oct. 9, 1934

1,975,853

UNITED STATES PATENT OFFICE 1,975,853

CATALYTIC DEHYDROGENATION OF PRIMARY ALCOHOLS

Wilbur A. Lazier, Marshallton, Del., assignor to E. I. du Pont de Nemours & Company, Wilmington, Del., a corporation of Delaware No Drawing. Application April 11, 1931, Serial No. 529,552

12 Claims. (Cl. 260—106)

This invention relates to catalytic dehydrogenation processes, and more particularly to an improved process for converting aliphatic primary alcohols to the corresponding esters and other valuable products. Specifically it relates to a process for the synthesis of ethyl acetate and butyl alcohol from ethyl alcohol by dehydrogenating the ethyl alcohol under high pressure in the presence of highly active catalysts.

This application is a continuation in part of my copending application Serial No. 280,962, filed May 26, 1928.

I am aware that copper, prepared by the reduction of its oxide, has long been known as a catalyst for the dehydrogenation of alcohols. It is further known, particularly from the investigations of Palmer in England, (Proc. Roy. Soc. 101A, 175 (1922) that certain difficultly reducible metal oxides greatly enhance the activity of metallic copper as a catalyst for the dehydrogenation of alcohols at atmospheric pressure, whereby aldehydes or ketones are formed. I am also aware that it has been proposed to use promoted copper catalysts for the high pressure synthesis of methanol from gases containing carbon monoxide and hydrogen. Accordingly, I make claim to none of the processes referred to in this paragraph.

This invention has as an object to provide an improved process for the catalytic synthesis of esters from primary alcohols. A further object is to carry out such a process by the use of highly active metallic copper catalysts promoted by incorporating with the copper one or more difficultly reducible metal oxides, preferably those which have dehydrogenating properties themselves. It is a specific object to carry out a process for the dehydrogenation of ethyl alcohol to a mixture of ethyl acetate and butanol under high pressure and at a suitable temperature in the presence of a catalyst comprising copper and a promoter selected from the class of difficultly reducible dehydrogenating metal oxides. Other objects will appear hereinafter.

United States application Serial No. 178,811, filed March 26, 1927, and now issued to Fred C. Zeisberg as United States Patent No. 1,708,460 discloses a process for the conversion of primary alcohols directly to esters. According to this patent ethyl alcohol for example, is pumped into a heated vessel maintained at a temperature above the critical temperature of the alcohol. The alcohol vapor is conducted continuously over a dehydrogenation catalyst such as reduced metallic copper, contained in a pressure resisting tube heated to about 350° C. at a rate equal to four volumes of liquid ethyl alcohol for each volume of catalyst per hour. The effluent gases are passed under pressure to a condensing coil where there separates unchanged alcohol containing ethyl acetate, butyl alcohol, and other products in lesser amounts. The hydrogen gas produced is bled out of the reaction system at such a rate as to maintain the pressure in the catalyst chamber at about 275 atmospheres.

According to the present invention, I have discovered that the composition of the dehydrogenation catalyst employed exerts a profound effect on the success of the above mentioned process. In an extensive investigation of catalysts suitable for the reaction in question, it has been found that a pure copper catalyst prepared by the reduction of copper oxide at a moderately low temperature with hydrogen, and such as has found extensive use in the successful manufacture of aldehydes and ketones by dehydrogenation of alcohols at atmospheric pressure, is quite unsuitable for the manufacture of esters under high pressure. In accordance with this invention I have found it desirable to employ instead of the pure metal, a composition comprising copper and certain promoters in the form of small amounts of difficultly reducible metal oxides. It is sometimes advantageous to use more than one oxide promoter, as for example magnesium oxide and zinc oxide taken together. The advantages of using the promoted catalyst compositions are two-fold. Such compositions not only bring about a higher initial conversion of the alcohol to more valuable products, but by the use of the promoted catalysts the period of high activity is increased, causing a delay in the onset of catalyst deterioration. These results were entirely unpredictable, since no investigaton of the catalyst requirements of ester manufacture had been made prior to my investigation thereof. Furthermore it cannot be assumed that the production of esters by dehydrogenation of alcohols under high pressure is analogous to the production of aldehydes and ketones at atmospheric pressure, since in the pressure process an entirely new set of reaction products are obtained. The results of my investigations indicate that the difficultly reducible dehydrogenating oxide promoters exert a specific action in directing the dehydrogenation towards high yields of esters at the expense of the lower conversion to aldehydes. Furthermore, the effect of the promoters on the longevity of the catalyst activity is without precedent.

In the following examples I have set forth several of the preferred embodiments of my invention, but they are presented for purposes of illustration and not as a limitation.

Example 1

About 1 part by weight of magnesium oxide and about 4 parts by weight of zinc oxide were thoroughly mixed in a dry condition with about 20 parts by weight of pure finely granular cupric oxide. A portion of the mixture was melted by passing an electric current through it, after which the melted portion was cooled, crushed, and screened to 6-14 mesh grains. The grains of mixed oxides were then slowly reduced at 150° C. in a gas mixture consisting of about 80% carbon dioxide and about 20% hydrogen, whereupon the mass was converted substantially to metallic copper containing magnesium oxide and zinc oxide as promoters.

In employing the above described catalyst mass for the manufacture of esters, the vapor of sulfur-free 95% ethyl alcohol was passed over the catalyst at a rate equal to about four volumes of the liquid alcohol for each volume of the catalyst per hour at a temperature of 375° C. and a pressure of 270 atmospheres. The condensed liquid products consisted of some unchanged ethanol containing about 20 per cent by weight of ethyl acetate, about 5% by weight of normal butanol and other higher products, and about 1.5% by weight each of acetaldehyde and acetic acid. After about 40 hours of continuous operation, the yield of ethyl acetate was diminished by less than 20%.

As illustrating the improvement due to the presence of the promoters, a similarly prepared pure metallic copper catalyst gave under the same conditions a condensate containing only 6% by weight of ethyl acetate, which after 12 hours of use had dropped to about 4%.

Example 2

A promoted dehydrogenation catalyst was prepared as follows: 100 parts by weight of dry powdered cupric oxide was mixed with 2 parts by weight of magnesium oxide. After pressing the powder mixture firmly into a refractory crucible a portion of the mass was melted by applying an oxy-hydrogen torch. The melted mass was cooled, crushed and reduced with hydrogen under controlled conditions as described in Example 1. When the resulting promoted copper catalyst was employed for the production of ethyl acetate under the conditions described in Example 1, there was obtained a condensate containing about 16% by weight of ethyl acetate and about 10% of other liquid products, including normal butanol and small amounts of acetaldehyde, acetic acid, acetone, and ethyl butyrate.

Example 3

One kilogram of pure cupric oxide was fused and thereafter a mixture of 75 grams of manganese oxide and 25 grams of magnesium oxide was dissolved in the melted oxide. The homogeneous mass was cooled and crushed to small granules. The copper oxide in the granules was reduced to metallic copper by passing over them the vapors of ethyl alcohol at a temperature of 225-250° C. and at atmospheric pressure. When used for the high pressure dehydrogenation of ethyl alcohol in accordance with the directions given in Example 1, this catalyst converted the ethyl alcohol to various useful products in the proportions indicated below:

| | Per cent |
|---|---|
| Ethyl acetate | 16.5 |
| Acetaldehyde | 2.0 |
| Acetic acid | 1.3 |
| Butanol | 7.5 |
| Acetone (and hydrocarbon) | 4.0 |

Although several catalyst compositions have been set forth in detail above, I do not intend to limit the scope of my invention to these specific formulas. I have found that a large number of difficultly reducible metal oxides when incorporated into a copper catalyst enhance the production of esters from alcohols. Among these may be named the oxides of elements occurring in the second group of the Periodic Table. These include the alkali earth oxides of sub-group A and also zinc oxide and magnesium oxide of sub-grouup B. I may also elect to employ manganese oxide, an oxide of the acidic type such as chromium oxide, or one or more oxides of the rare earth group of elements. By difficultly reducible metal oxide I mean to include those oxides of the metals which are not essentially reduced to the metallic state by prolonged exposure in a state of purity to the action of hydrogen at atmospheric pressure and a temperature of 400-450° C.

Such difficultly reducible metal oxides have been classified by Sabatier (Sabatier-Reid, Catalysis in Organic Chemstry, D. van Nostrand Company, New York, 1922) according to their catalytic properties as dehydrogenating, dehydrating, or mixed oxides. I have carried out extensive research with the object of discovering the best promoters for copper catalysts and I have found that those oxides which are predominantly dehydrogenating in their action on alcohols are the best for this purpose. I wish particularly to emphasize the value of magnesium oxide, either when employed as the only promoter or together with another of the oxides already named. An especially good result is obtained when magnesium oxide is employed in a copper catalyst together with one of the predominantly dehydrogenating oxides such as zinc oxide or manganese oxide.

The percentage of promoter incorporated into the copper catalysts may be widely varied as will be set forth below. Likewise the relative proportion of two oxide promoters may be varied considerably, but I prefer for example to use about two molecular weights of zinc oxide or manganese oxide for each molecular weight of magnesium oxide. A highly satisfactory catalyst for the production of ethyl acetate from ethanol may consist of 15 moles of manganese oxide, 8 moles of magnesium oxide, and 77 moles of copper. The manganese oxide may be replaced wholly or in part by zinc oxide with a similar result.

Any suitable method, such as coprecipitation, may be employed for incorporating the promoter or promoters with the copper catalyst. A convenient method consists of fusing a mixture of pure copper oxide with one or more difficultly reducible metal oxides, after which the melt is crushed and reduced with hydrogen or other reducing agent. The fusion may be carried out by electrical conductance, by use of a gas torch, arc furnace, or any other suitable means. Although I prefer to start with cupric oxide, oxygen is lost during the fusion process, leaving a finished product for the most part in the cuprous state of oxidation. The upper limit of the amount of promoter constituents that may be added by this method is determined by the extent of elevation of the melting point and increase in viscosity of the melted copper oxide mixture. In place of using metal oxides I may as well employ instead the hydroxides, carbonates, oxalates, or other salts or compounds which yield the oxides under the conditions of the fusion process.

I prefer to use my promoted catalysts in a reduced condition, in which the copper is substantially in the metallic form. The oxide compositions already described may be reduced in place in the apparatus employed for the synthesis of esters or they may be prereduced before charging into the catalytic apparatus. Diluted hydrogen is ordinarily employed as the reducing agent at temperatures of 100–300° C., but other reducing agents such as carbon monoxide, ammonia, water gas, or alcohol vapor may be used.

In carrying out the synthesis of esters from alcohols under pressure by use of promoted copper catalysts in accordance with this invention, the specific operating conditions may be varied over a wide range. For example in producing ethyl acetate from ethyl alcohol, any pressure above 10 atmospheres may be used. I prefer however to use a pressure greater than 50 atmospheres and less than 500 atmospheres. The effective temperatures lie above 100° C. and preferably between 200° C. and 500° C. The rate of flow of alcohol vapor is quite immaterial and is a function of the activity of the catalyst employed.

As many apparent and widely different embodiments of this invention may be made without departing from the spirit and scope thereof, it is to be understood that I do not limit myself to the specific embodiments thereof except as defined in the appended claims.

I claim:

1. The process of carrying out a catalytic dehydrogenation which comprises heating a primary alcohol in contact with a catalyst comprising essentially metallic copper and a difficultly reducible oxide at a temperature above 100° C. and a pressure in excess of 10 atmospheres, the said catalyst being such as obtainable by fusing a mixture of copper oxide and a difficultly reducible metal oxide and reducing the fused mixture.

2. The process of carrying out the catalytic dehydrogenation of a primary alcohol to form the corresponding ester and other organic products which comprises heating the vapor of said alcohol in contact with a catalyst comprising essentially metallic copper and a difficultly reducible metal oxide at a temperature above 100° C. and a pressure in excess of 10 atmospheres, the said catalyst being such as obtainable by fusing a mixture of copper oxide and a difficultly reducible metal oxide and reducing the fused mixture.

3. The process of dehydrogenating a primary aliphatic alcohol to form the corresponding ester and other organic products which comprises heating the vapor of said alcohol in contact with a dehydrogenating catalyst comprising essentially metallic copper and a difficultly reducible metal oxide at a temperature above 100° C. and a pressure in excess of 10 atmospheres, the said catalyst being such as obtainable by fusing a mixture of copper oxide and a difficultly reducible metal oxide and reducing the fused mixture.

4. The process of claim 3 in which the difficultly reducible oxide is an oxide of a metal of the second group of the periodic table.

5. The process of claim 3 in which the catalyst comprises metallic copper and a plurality of difficultly reducible metal oxides.

6. The process of dehydrogenating a primary aliphatic alcohol to form the corresponding ester and other organic products which comprises heating the vapor of said alcohol in contact with a dehydrogenating catalyst comprising essentially metallic copper, magnesium oxide and zinc oxide, at a temperature above 100° C. and a pressure in excess of 10 atmospheres.

7. The process of carrying out the catalytic dehydrogenation of a primary alcohol to form the corresponding ester and other organic products which comprises heating the vapor of said alcohol at a temperature between 200° and 500° C. and at a pressure between 50 and 500 atmospheres in the presence of a catalyst comprising essentially metallic copper and a difficultly reducible metal oxide, the said catalyst being such as obtainable by fusing a mixture of copper oxide and a difficultly reducible metal oxide and reducing the fused mixture.

8. The process of dehydrogenating a primary aliphatic alcohol to form the corresponding ester and other organic products which comprises heating the vapor of said alcohol at a temperature between 200° and 500° C. and at a pressure between 50 and 500 atmospheres in the presence of a catalyst comprising essentially metallic copper and a plurality of difficultly reducible metal oxides, including magnesium oxide, the said catalyst being such as obtainable by fusing a mixture of copper oxide and a plurality of difficultly reducible metal oxides and reducing the fused mixture.

9. The process of dehydrogenating ethyl alcohol to form ethyl acetate and other organic products including normal butyl alcohol, acetaldehyde, acetone, and acetic acid, which comprises passing the vapor of said ethyl alcohol over a dehydrogenating catalyst comprising essentially metallic copper and a plurality of difficultly reducible metal oxides at temperatures above 100° C. and at pressures in excess of 10 atmospheres, the said catalyst being such as obtainable by fusing a mixture of copper oxide and a plurality of difficultly reducible metal oxides and reducing the fused mixture.

10. The process of claim 9 in which the temperature is between 200° and 500° C. and the pressure between 50 and 500 atmospheres.

11. The process of dehydrogenating ethyl alcohol to form ethyl acetate and other organic products, including normal butyl alcohol, acetaldehyde, acetone, and acetic acid, which comprises passing the vapor of said ethyl alcohol over a dehydrogenating catalyst comprising essentially metallic copper and magnesium oxide at a temperature of about 375° C. and a pressure of about 270 atmospheres, the said catalyst being such as obtainable by fusing a mixture of copper oxide and magnesium oxide and reducing the fused mixture.

12. The process of dehydrogenating a primary aliphatic alcohol to form the corresponding ester and other organic products, which comprises heating the vapor of said alcohol at a temperature between 200° and 500° C. and at a pressure between 50 and 500 atmospheres in contact with a catalyst prepared by fusing a mixture of copper oxide and a difficulty reducible metal oxide and reducing the fused mixture.

WILBUR A. LAZIER.